United States Patent Office 3,364,011
Patented Jan. 16, 1968

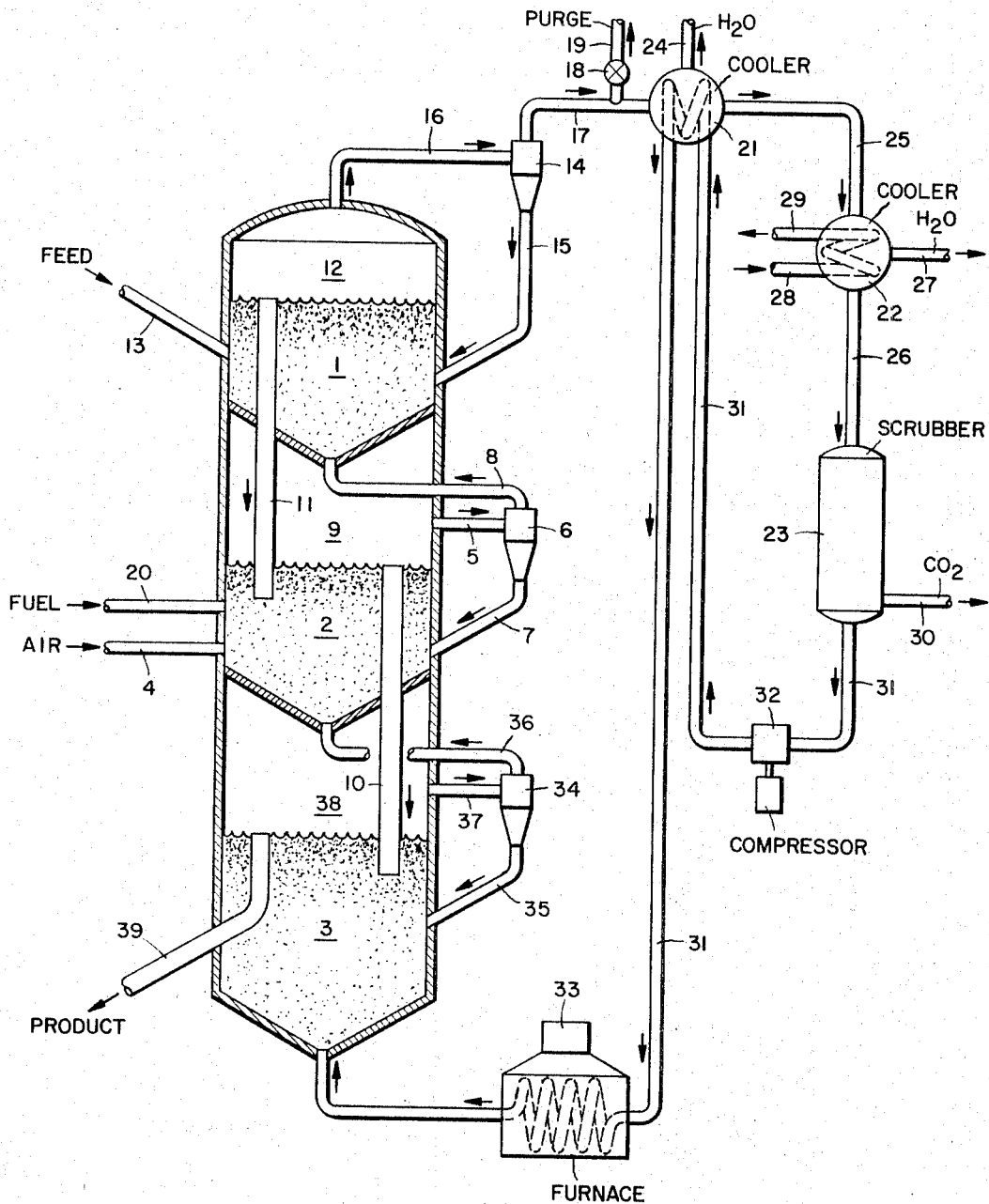

3,364,011
PROCESS FOR THE PRODUCTION OF IRON BY THE DIRECT REDUCTION OF IRON OXIDE ORE
Walter J. Porter, Jr., Syosset, N.Y., and John F. Moser, Jr., Baton Rouge, La., assignors to Esso Research and Engineering Company, a corporation of Delaware
Continuation-in-part of application Ser. No. 265,800, Mar. 18, 1963. This application Feb. 23, 1966, Ser. No. 536,516
15 Claims. (Cl. 75—26)

This is a continuation-in-part of application S.N. 265,800 filed Mar. 18, 1963, now forfeited.

This invention relates to the production of metallic iron by direct reduction of particulate iron ores in a process wherein the ores are fluidized in a series of separate beds and reduced by contact with carbon monoxide and hydrogen and mixtures of these with other gases, and the spent gases regenerated by removal of oxidized components, and recycled. In particular, the invention relates to such process wherein oxygen, or oxygen-containing gas, is injected directly into an intermediate bed of the series and combusted with carbonaceous fuel to form principally carbon monoxide, carbon dioxide, and water. In the generation of such gases, the oxygen and hydrocarbon fuel can be simultaneously injected and burned or oxygen per se can be injected and burned in situ with the reducing gases. The combusted gases from the said intermediate bed, in either event, are thence passed into a contiguous low temperature water-gas shift stage wherein water is converted or shifted to hydrogen while carbon monoxide is oxidized to carbon dioxide.

Processes for the production of iron by the direct reduction of iron ore, which consists essentially of iron oxides containing ferric oxide, or mixtures of ferric oxide and other iron oxides, are well known. In such processes, the ore is treated in a vertical reactor, or reactors, wherein is contained beds fluidized by ascending gases, at temperatures ranging generally from about 1200° F. to just below the sintering temperature of the ore, i.e., about 1600° F. to about 1800° F. for most ores. A plurality of beds is generally provided, these being staged or arranged in series, one below another, as separate reduction zones, operated at the same or different elevated temperatures.

It is conventional to provide countercurrent contact between the gases and ore, e.g., to introduce particulate oxidic iron ores into the top stage of a reactor, and flow the ore downwardly from one fluidized bed to a next succeeding bed while consecutively contacting the individual beds with an ascending stream of reducing gases introduced or injected directly into the final stage of the reactor. The state of oxidation of the ore within each succeeding bed of the series is progressively lowered, while simultaneously at least some of the reducing gas is oxidized. Thus, in the hot gases, e.g., some of the carbon monoxide of the gas is oxidized to carbon dioxide and the hydrogen component is oxidized to water. In these several stages, the ore is reduced, e.g., from ferric oxide to magnetic oxide of iron (or mixture approximating such oxide composition), the magnetic oxide of iron (i.e., magnetite) is reduced to ferrous oxide, and ferrous oxide is reduced to substantially metallic iron. These reactions can be staged so that each of these reactions, per se, can be further sub-divided or provided in one or more stages of the overall process. Generally, at least in a final ferrous reduction stage, from whence the iron product is withdrawn, the metallic iron product ranges from about 80 to about 95 percent metallic iron.

The reduced iron product wtihdrawn from the final stage of the reactor can be melted or agglomerated to form briquettes. Lime, alkaline earth metal oxides, e.g., the oxides of calcium and magnesium (magnesia), can be introduced into the fluidized beds of the process so as to appear in the reduced iron product at the time of compaction. When this is done, the final product can contain from about 0.1 to about 5 percent, based on the weight of the reduced iron product, of these materials. In any event, the hot particulate product from the final stage is introduced to a riser and, while in contact with the reducing gas atmosphere, is transferred to a hopper. From the hopper, the particulate product is compacted, e.g., fed into the nip of a pair of rolls via a screw type device, is compacted and agglomerated at about 1375° F. to about 1430° F. The press forms briquettes generally in tandem relationship one to another. These can be trommelled, cooled, further treated if desired and then stacked for storage or use.

Most fluidized iron ore reduction processes utilize externally generated gas, i.e., gaseous mixtures consisting of carbon monoxide and hydrogen, or mixtures of these and other gases, which are injected while hot into the bottom stage of the reactor. Such gaseous mixtures (including some unreacted hydrocarbons) are generally formed externally of the reactor by partial oxidation of hydrocarbons or by water-gas shift conversion reactions. In certain other processes, unreacted hydrocarbons have been injected directly into the processes, e.g., into a ferrous reduction stage, to generate a portion of the reducing gases in situ. Such processes, generally termed direct injection or partial direct injection processes, have proven impractical largely due primarily to the difficulties associated with providing sufficient heat for the reactions.

It would be very desirable to provide a process wherein the reducing potential of the gas is completely used in reducing the iron ore in a single pass through the reactor. However, once-through processes are extremely costly in that the reducing gases, depending on the particular ores being reduced, are used inefficiently and there would be a resultant large waste of reducing gas production capacity if the gas was disposed of after one pass. This considerably increases the cost of the reducing gas making the process uneconomic.

The cost of generating reducing gases is a major factor in the cost of the gas. Separate gas generators wherein hydrocarbon fuels are partially oxidized with an oxygen-containing gas, e.g., oxygen, water, or steam with or without a catalyst though producing a useable synthesis gas are expensive and the cost of the generators raises the cost of the gas. Also, the effluent gases from this zone normally have to be cooled to condense and remove water and carbon dioxide and then reheated before they can be used to reduce the iron ore. The reactants used to prepare reducing gases, for example pure oxygen, are somewhat dangerous to handle and costly. The use of pure hydrogen as a reducing gas raises the cost of the reducing gas.

Another problem in obtaining an economic efficient method of direct reduction of iron ore involves the method of supply the heat needed to carry out the reduction reactions. The reduction reaction with carbon monoxide is slightly exothermic if pure carbon monoxide were used; however, the high cost of pure carbon monoxide makes taking advantage of this feature uneconomic. On the other hand, the reduction reaction using hydrogen as the reducing agent is strongly endothermic and large amounts of heat need to be provided to carry out this reduction. Normally, a compromise is made wherein a blend of carbon monoxide and hydrogen is used to carry out the reduction and the net deficit in needed heat energy is supplied. However, using a mixture of carbon monoxide and hydrogen in a once-through process would still render the cost of the synthesis gas expensive.

All attempts to recycle a synthesis gas containing large amounts of carbon monoxide have been unsuccessful. Applicants have found that gases containing large amounts of carbon monoxide will strongly react in the presence of catalytic metals, especially ferrous metal surfaces such as iron, to deposit carbon at temperatures in the range of 900 to 1200° F. The resulting reaction wherein carbon monoxide and hydrogen are used to reduce iron ore are normally carried out at temperature ranges of 1200 to 1600° F. In order to recycle these off gases it is necessary to cool these gases to about ambient temperature and to remove from the gases carbon dioxide and water produced as a result of the reducing reaction and then to recompress and heat these gases and feed them back into the bottom of the reactor. The problems of carbon deposition occurs both on cooling and on heating the gas. The deposition of carbon in the temperature range of 900 to 1200° F. from gases containing large amounts of carbon monoxide have caused plugging and failure of standard heating equipment, pump, and transfer lines. Certain forms of carbon generated in reactions with ferrous metal surfaces have also led to serve corrosion problems. Because of the pressure differential between the bottom of the reactor and the top of the reactor, the effluent gases from the top of the reactor must be compressed so that they can be fed to the bottom of the reactor. To efficiently remove water and carbon dioxide from these recycle gases, it is desirable to cool the gases down to about ambient temperature and then to heat the purified gases back up to temperatures of about 1200 to 1600° F. for introduction into the reducing zone. Also, the heated gases will supply heat to the reduction zone which will assist in carrying out the reduction reactions taking place in the zone.

With reference to supplying the necessary heat for carrying out the endothermic reactions, it was found impractical to supply all the heat for the reduction by excessively preheating the ore feed because at extremely high temperatures sintering, agglomeration, and defluidization of the fluidized bed of ore would occur. It is also impractical to supply all of the heat to the ferrous reduction zone by excessive preheating of the fresh reducing gases prior to feeding them to the reduction zone because of preheating equipment temperature limitation. Since enough heat cannot be added at the top nor at the bottom of the reducing operation, it is difficult to obtain the proper heating for the reduction process. This problem is partially solved by both preheating the recycle gas of the fresh gas thus supplying heat to the last or final stage of the reduction. However, satisfactorily supplying heat to the intermediate stages of the reduction process has been extremely difficult. Also, it has been difficult to control the reactions at the desired rates in the initial and final stages where it was necessary to overheat the ore in the initial stage or the reducing gas in the final stage. Without overheating it was found that the intermediate stages were deficient in the heat required to reduce the ores in this stage. The known processes of supplying heat to the reduction zones and for circulating or recycling reducing gases have proved to be inefficient and uneconomic to carry out commercial direct iron ore reduction. These processes also lack in flexibility of handling solids and gas contacting required to carry out an efficient process.

In accordance with the present invention, iron ore is reduced in a plurality of stages to metallic iron, the process utilizing at least three separate zones, with the initial and a succeeding zone, each serving several functions. The initial or first zone is a preheat and pre-reducing zone for iron ore, and also functions as the water-gas shift conversion zone wherein carbon monoxide, in the presence of ferric oxide, is converted catalytically to carbon dioxide while water is coverted to hydrogen. The intermediate or succeeding zone provides the secondary stage of reduction for converting the iron ore to ferrous iron. This zone also functions as a heating and combustion zone. In this zone oxygen, or an oxygen-containing gas, e.g., air, is injected and burned with carbonaceous fuels to supply additional heat for the reduction, to generate additional carbon monoxide and some carbon dioxide and perhaps some additional hydrogen and water. Upon feeding the gaseous mixture from this zone into the said initial or preceding zone, inter alia, the water is shifted to hydrogen. The final zone, or zones, is primarily a reducing zone wherein the ferrous iron is reduced by contact with high concentration hydrogen reducing gas to produce metallic iron. In a preferred process five stages or zones are provided, the last three zones (viz., zones 3, 4 and 5) being those wherein ferrous oxide is reduced, these zones being operated at temperatures ranging from about 1200° F. to about 1600° F., and at pressures ranging from atmospheric to about 150 pounds per square inch. In the last zone of the series, wherein the degree of metallization is highest, a substantial amount of heat is added as the sensible heat of preheated reducing gas.

The present invention contemplates the combination of a low temperature preheat water-gas shift conversion zone to which a ferric oxide containing ore is introduced, or formed in situ, and an adjacent or succeeding zone wherein ore is reduced and oxygen is burned or combusted with carbonaceous fuel to generate gaseous products including carbon monoxide, carbon dioxide and water. These zones are followed by one or more ferrous reduction zones.

By feeding the gaseous product or effluent from the combustion zone into the low temperature preheat zone, in the presence of ferric oxide at properly defined conditions, water can be shifted to hydrogen, while the carbon monoxide is simultaneously oxidized to carbon dioxide. The latter can be readily removed from the off-gas from the preheat zone to provide a regenerated reducing gas at relatively low temperature, this lessening heat losses due to cooling. Another advantage is that there is only a single gas stream to cool and purify. Moreover, the gas at relatively low carbon monoxide content can be advantageously injected, with makeup reducing gas if desired, into the final ferrous reduction stage, this lessening the complications involved in the reheat operation. Further, the higher hydrogen concentration is especially desirable to reduce the ferrous oxide, which is more difficult to reduce than the other iron oxides. Not only does the reaction provide greater reducing power at a needed location, but supplemental heat is supplied for the reduction reaction. Furthermore, the lower temperature conditions the reforming of methane from carbon monoxide, which normally occurs to lessen reduction efficiency and hydrogen product, does not occur. This is so despite the favorable equilibrium considerations expected even at the lower temperatures. Further, the reversion of carbon monoxide to produce free carbon is insignificant and, what is more, there is substantially no carburization of metal surfaces.

A preheated oxygen-containing gas, e.g., air, or a hydrocarbon fuel and a preheated oxygen-containing gas, e.g., air, is thus fed to the second zone of the reactor, or the intermediate heating zone, and therein combusted. In one type of combustion reaction, the oxygen chemically combines with a carbonaceous fuel, e.g., carbon or carbon monoxide, or both, in situ, to generate carbon monoxide and carbon dioxide, or both. The hydrogen which is present is converted to water. Heat is liberated by the reaction. In another combustion reaction a carbonaceous fuel, especially a hydrocarbon fuel, is directly added to the process along with the oxygen, or oxygen-containing gas, and the hydrocarbon is partially oxidized with a deficient amount of the oxygen to provide elevated temperatures and to produce a gas consisting primarily of carbon monoxide and hydrogen which contains some carbon dioxide and water. Depending on the temperature and/or pressure at which the reactions are carried out and the ratio of air to fuel added or already present in this zone, the amount of water and carbon dioxide produced can be closely controlled. These gases also function as additional reducing gas to aid in the reduction of the iron oxides substantially to ferrous oxide. For example, the iron oxides fed to the combustion zone will consist primarily of $Fe_2O_3$ and $Fe_3O_4$. These oxides are reduced to oxides consisting primarily of FeO, though metallic iron can be present. The temperature in this zone can be closely controlled at any desired level by controlling the rate of injection of fuel and air. This in turn controls the temperature of the off-gas to the preceding zone as well as the residual heat in the reduced ore which is fed to the third or final ferrous reduction zone.

The oxygen should be added in quantity sufficient to combine with the carbonaceous fuels within the reduction stage. Generally, from about 0.002 mole to about 0.02 mole of oxygen, per mole of reducing gas, is added to the said combustion zone. The amount of oxygen injected can be just sufficient to combine with the carbonaceous fuels present, including also the hydrogen. Where a hydrocarbon fuel from an external source is simultaneously injected into the zone the amount of oxygen injected should be insufficient to provide for the complete combustion of the added hydrocarbon. The oxygen can, if desired, be injected into the top of the zone or into the space above the fluidized bed per se to minimize reoxidation of the ferrous oxide. Better heat distribution is obtained, however, by injecting the oxygen, or oxygen and hydrocarbon, directly into the fluidized bed.

The hot off gases from the combustion zone are fed to the preheat and pre-reducing zone for the iron ore while the temperature of the ore fed into this zone quenches the gas to the preheat zone and increases the reaction temperature of the combustion zone. If the temperature and the residence time of the gases in the preheat pre-reducing zone are properly controlled, the iron oxides in the preheat pre-reducing zone will function as a water-gas shift catalyst converting carbon monoxide to carbon dioxide and equal molar amounts of water to hydrogen. In the event that there is not sufficient water present in the gases fed to this zone, steam can be added in order to push the reaction to completion and to obtain a maximum amount of conversion from the reaction: $CO + H_2O \rightarrow CO_2 + H_2$. The entering iron ore functions as the conversion catalyst for the water-gas shift conversion reaction and in so doing the ore is preheated and dried by the hot off-gases from the gasification reaction and partially reduced to a lower state of oxidation. The thus preheated ore is continuously fed to the zone below in which it is further reduced as previously described.

The off-gases from the preheat and pre-reducing zone contain substantial amounts of hydrogen, carbon dioxide, and water, and very minor amounts of carbon monoxide, methane, and nitrogen. Whether or not nitrogen is present at all or in what concentration it is present will depend largely on whether air, oxygen-enriched air, or pure oxygen was used as the oxidizing agent for the partial combustion of the fuel in zone 2. The effluent gases are cooled by heat exchange with a suitably cooled fluid and, on cooling, substantially all of the water present condenses and is removed. Preferably these gases are cooled to about ambient temperature since at ambient temperature removal of carbon dioxide from these gases is more efficient. After removal of water, the dry gases are contacted in a manner known to the art for removal of carbon dioxide. The thus treated gases are then compressed and sent to a preheat furnace where they are increased in temperature to a temperature substantially above the temperature required to carry out the reduction in zone 3. The reduction temperature maintained in zone 3, wherein ferrous oxide is reduced to metallic iron, can be carefully controlled by adjusting the preheat temperature of the reducing gases fed to this zone. By shifting the carbon monoxide in the off-gases from the reduction reaction to hydrogen and recycling the hydrogen substantial savings in cost of reducing gas is obtained. The recycled hydrogen gas can be raised in temperature to the preferred level for carrying out the reduction in zone 3 by conventional means without catastrophic carbonization.

The pressure in the reactor will vary from the high pressure in zone 3 to low pressure in zone 1 due to the pressure loss in the reducing gases passing through the fluidized beds of iron ore in the reduction zones. A pressure difference of 15 to 200 p.s.i.g. depending on the depth of the bed is not uncommon. With this in mind, the reduction reactions described can be carried out at pressures varying from atmospheric pressure up to about 800 p.s.i.g. and even higher. The temperatures at which the reduction is carried out can vary between about 900° F. to about 1800° F. and will vary within each of the reducing zones depending in part on the degree of completion of the reduction reaction carried out in that zone.

The use of an oxygen containing gas as the combustion gas and of hydrocarbons as the fuel to generate the reducing gas represents the cheapest starting materials for producing a reducing gas. The proposed process describes an efficient method of recycling the off-gases from the reducing zones and obtaining maximum reducing capacity for all the reducing constituents generated in the gasification zone. The several functions of the gasification zone, that is zone 2, as a reducing zone and as a gasification zone and as a means of providing heat for carrying out the reduction reaction represents a substantial savings in equipment cost and space, and provides for heating and production of reducing gas. The use of the preheat and pre-reduction zone, that is zone 1, also as a shift conversion zone combines in this single zone three of the primary functions required to carry out an efficient process. This zone also overcomes the problem of catastrophic carbonization which would normally occur in cooling and recycling an effluent gas containing a large amount of carbon monoxide as the gas transited the temperature range of about 900 to 1200° F. Since in the preheat pre-reduction zone the medium used to cool these gases, i.e., the ferric oxide solids, from the temperatures present in zone 2 to the temperatures present in the shift conversion zone contain large amounts of oxygen, any carbon which may be deposited as a result of the carbonization reaction will be immediately oxidized by the oxygen in the iron ore or by carbon dioxide or by water present in the zone thereby overcoming the problem of carbonization as a result of cooling the recycle gases. The problem of catastrophic carbonization associated with reheating the recycle gases prior to reintroducing them into the reduction zone is overcome in applicants' process by shifting the carbon monoxide to carbon dioxide and removing it from the recycle gases, and thereby recycling and preheating only the hydrogen. Catastrophic carbonization is obviously not a problem with hydrogen. The above-described process has the advantage of compactness and considerable flexibility in controlling the reaction conditions in each of the zones in that there is sufficient heat energy available for any of the three beds as desired. Also, the gas with the highest reducing potential, namely, substantially pure hydrogen, is provided in abundant amounts in the zone in which high capacity reducing gas is required, i.e., zone 3 where the FeO is reduced to iron. The residence time required for carrying out each of the described reactions in the reaction zones can be adjusted by varying the depth of the bed in the zone or the diameter of the zone or by staging of the zones. Staging can be accomplished in the manner known to the art. Excess hydrogen produced by the system can be withdrawn instead of all of it being recycled to zone 3.

An advantage of this process is that the reduction reaction carried out in zone 2 where carbon monoxide and hydrogen are the reducing gases is carried out at substantially higher temperatures than the reduction reaction in zone 3 where hydrogen is used as the reducing agent. The partially reduced iron ore solids, flowing by gravity from zone 2 to zone 3, contain a considerable amount of sensible heat in the solids, which heat can be used to carry out the endothermic reduction of the iron with hydrogen. Therefore the amount of preheat added in this zone as sensible heat of the reducing gas can be decreased. This situation provides additional flexibility for furnishing the heat requirements of the process.

The use of elevated pressures results in several advantages: the size of the reactor can be substantially reduced, maintenance of fluid beds in the reaction zones is materially aided, the necessary removal of water from the recycle gas stream can be effected without substantial amounts of refrigeration, and repressuring of the recycle gas to offset the pressure drop in the system is more economical at the higher pressures.

The accompanying drawing diagrammatically illustrates one form of the process of this invention. Although the drawing illustrates one arrangement of apparatus in which the process of this invention may be practiced, it is not intended to limit the invention to the particular apparatus or material described. It is also to be noted that the various pieces of standard equipment such as pumps, valves, electrical connections, heat exchange equipment, etc., have been omitted from the drawing in order to simplify the explanation of the drawing.

The reduction of metal oxides with a reducing gas comprising carbon monoxide and hydrogen, or hydrogen alone is well known. Various metal oxides including iron, nickel, chromium, vanadium, and titanium ores and the like have been reduced in this manner. This invention, however, is principally concerned with the reduction of iron oxides to metallic iron, whether the iron oxides are added abinitio or generated in situ in an early stage of the process. In accordance with the present invention, iron oxides consisting essentially of $Fe_2O_3$ and perhaps some $Fe_3O_4$ are reduced to 90 or more percent metallic iron.

The hydrocarbon fuels used in accordance with the present invention to generate the reducing gases and heat for carrying out the endothermic reduction reactions can be selected from the normally gaseous hydrocarbons such as methane, propane, ethane, butane, or normally liquid hydrocarbons such as light naphtha, light fuel oil, heavy naphtha or heavy residual oil. Natural gas which consists essentially of methane is a good fuel for this process. The relative cost of the various fuels will determine which feed is used. The hydrocarbon fuel is partially oxidized with deficient amounts of oxygen to produce the combustion products containing primarily carbon monoxide and hydrogen and small amounts of carbon dioxide and water. The oxidizing gas can either be air, oxygen-enriched air, or pure oxygen. Where air is used, there will be a substantial buildup in the circulated gases of inerts consisting primarily of nitrogen which must be purged from the system. If pure oxygen or oxygen-enriched air is used, the amount of purging required to maintain an efficient operation is reduced. It is not disadvantageous, however, to have some nitrogen present in the system since the nitrogen increases the density of the fluidizing gases and assists in fluidizing the fluid beds of finely divided iron ore.

The ferric oxide in zone 1 which is being preheated functions as the water-gas shift conversion catalyst and is continuously renewed in this zone and fresh catalyst is always present to carry out the water-gas shift conversion reaction. Reduction in this zone is insufficient to produce metallic iron and hence, despite otherwise favorable equilibrium conditions, methane or higher hydrocarbon formation does not occur. Nonetheless, the water-gas shift reaction goes essentially to equilibrium while ferric oxide is readily dehydrated and reduced to magnetic oxide of iron. The use of the iron ore feed as the catalyst eliminates the need for a separate catalyst for this reaction. Also in zone 2, the partially reduced iron ore functions as a catalyst for the gasification reaction taking place in this zone wherein the hydrocarbon fuel is partially oxidized and cracked to produce carbon, carbon monoxide and hydrogen. No additional catalysts are used for applicants' process and both of the catalysts that would normally be required are supplied by the iron which is actually being reduced in the process.

The iron ore present is in the form of finely divided solids and the reduction reactions are carried out in fluidized beds by direct contact of the fluidized solids with reducing gas. As illustrated in the accompanying drawing at least three zones are required to carry out applicants' process. However, any of these zones may be further divided into two or more beds or stages to provide the desired degree of staging of gas and solids and residence time for the reactions to take place in a particular zone. In a preferred embodiment, for example, the low temperature preheat water-gas shift conversion zone is divided into a plurality of stages to obtain better heat utilization. In an especially preferred embodiment from 2 to about 7, and even more preferably from 2 to about 3 stages are employed in the water-gas shift conversion zone. The fluidized beds of iron may vary between about 5 and 30 ft. in diameter and about 3–100 ft. in height. In a fluid bed operation, the gas velocity used depends on the particle size and the density of the ore and is selected so as to maintain the finely divided solids in a dense, turbulent fluidized bed simulating a liquid. The finely divided solids undergo extensive vertical and horizontal motion and assume a pseudo liquid level. Maintenance of the iron ore in the form of a fluid bed during reduction is assured by passage of reducing gas and/or of combustion products through the several fluid beds. Also, similar to water, the pressure at the bottom of a fluid bed will be directly proportional to the height of the fluid bed and the fluidizing gases passing through the bed to the top of the bed. It is this change in pressure in passing through the several fluidized beds of finely divided solids which must be made up for by a pump, which pump, in recycling the reducing gases from the top of the reactor, must increase the pressure of the recycled gases sufficiently so that they may be introduced into the bottom of the reactor. The recycle pump must make up for the difference in pressure from the top of the last fluidized bed to the bottom of the first fluidized bed. The pump must make up this difference in pressure regardless of the pressure at which the overall reduction reaction is carried out.

In addition to being a substantial factor in maintaining fluidization and decreasing the size of the reaction vessels, use of elevated pressures simplifies removal of water of reaction, which is formed by the reduction reaction and which is present as unreacted water from the shift conversion reaction, and minimizes the effect of the pressure drop accompanying the reduction reaction. It is necessary to remove water from the recycled hydrogen stream to prevent water from acting as an oxidizing agent when it is introduced into the ferrous reduction zone. If elevated pressures are used, expensive refrigeration is not required to condense and remove the water from the recycle stream. Another factor that makes desirable the employment of elevated pressure is that the repressuring of the recycle gas stream to overcome the pressure drop occurring in the reaction, carbon dioxide, and water removal zones is economically effected at elevated pressures. At low pressure, for example atmospheric pressure, the power required to offset an equivalent pressure drop is substantially greater than that required to offset the same pressure drop at elevated pressures.

As previously described, applicants' process requires the use of at least three zones. The first zone (or zones) is a preheat and pre-reducing zone for ore that also functions as a water-gas shift conversion zone and as a cooling zone for the reducing gas. The second zone is a gasification zone wherein a carbonaceous fuel is burned. Generally carbon monoxide and hydrogen are burned with oxygen or produced and burned by partial oxidation of a hydrocarbon fuel. This zone is also a primary reduction zone and also a heating zone. The third zone is primarily a reducing zone where high capacity reducing gases are contacted with ferrous iron and reduced to metallic iron. The reducing gases in these three zones flow countercurrently to the solids flow, which solids flow from the first to the second to the third zone by gravity flow. These three zones have the iron present in the beds as fluidized beds of iron and the iron flows much the same way as water does by overflowing one zone and falling into the next, etc. Though the design of the present process offers a great deal of flexibility in carrying out the reaction, the conditions within each zone must be controlled so that the desired reactions are favored.

In zone 1, which is the ore preheat, pre-reduction, shift conversion and gas cooling zone, the temperature is maintained at about 600–900° F. and preferably at about 700–800° F. This is obtained by controlling the sensible heat of the hot gases introduced into zone one from zone 2 and by controlling the amount of steam or water added to this zone. By controlling the feed rate of the iron ore to this zone, the residence time of the ore in this zone and the rate of introduction of gases from zone 2, the temperature in this zone can be carefully controlled at the desired level. The pressure in the reactor, this is including zones 1, 2, and 3, will vary between about atmospheric up to about 850 p.s.i.g., preferably from about 70 to 650 p.s.i.g. However, the pressure difference between the effluent gases leaving zone 1 and the pressure existing in the bottom of the fluid bed in zone 3 may vary between 5 p.s.i.g. and 200 p.s.i.g. This pressure difference will depend largely on the height of the fluid beds employed in the system and the number of fluid beds employed. There also is a slight pressure drop as the effluent gases from zone 1 go through the water removal zone and carbon dioxide scrubbers. This pressure difference, however, is minor as compared to the pressure drop existing in the reactor between zones 1 and 3.

The iron ore introduced into zone 1 consists primarily of $Fe_2O_3$ and perhaps some lower oxides such as $Fe_3O_4$. The effluent gases removed from zone 1 contain less than 10% of carbon monoxide by volume and preferably less than 5% by volume. The amount of carbon dioxide in this zone is increased over that in the effluent gas from zone 2 due to the reduction of some of the iron ore in this zone with carbon monoxide. Also, the amount of water in this zone is increased over that in the effluent gas from zone 2 due to partial reduction of the ore with hydrogen during the preheating cycle. The amount of water present is increased by any steam or water injected to help carry out the water-gas shift reaction.

Zone 2, which functions as a heating zone, a gasification zone and a reduction zone, is operated at a temperature of 1200–1800° F., preferably at a temperature of 1500–1700° F. The iron ore which was preheated in the previous zone is introduced into this zone and is reduced from ore consisting primarily of $Fe_2O_3$ and $Fe_3O_4$ to ore consisting primarily of FeO and some $Fe_3O_4$. By oxidation of carbon monoxide or hydrogen, or both, or by partial oxidation of the hydrocarbon fuel under controlled conditions, the carbon dioxide/carbon monoxide ratio and the water/hydrogen ratio in the effluent gases from this zone are maintained below the equilibrium level required for reduction of $Fe_3O_4$ to FeO. The carbon dioxide to carbon monoxide ratio can be 1.5 to 5.25, and preferably 3.0 to 4.6, and the water to hydrogen ratio can be 0.9 to 9.0, and preferably 3.0 to 6.7. These gases at these ratios are introduced into zone 1 wherein the carbon monoxide reacts with water and is converted to about equal molar amounts of hydrogen and carbon dioxide. Some carbon monoxide and hydrogen react with the ore and partially reduces it. The hydrocarbon fuel is mixed with air in zone 2 and partially oxidized wherein the atomic ratio of oxygen in the air to the ratio of carbon in the hydrocarbon is between 0.5 to 3.0 and is preferably between 0.75 and 1.5.

The operating conditions of zone 3 are substantially less critical than those in either zone 1 or 2. They must, however, be maintained such that the reduction of the FeO to metallic iron in this zone can be efficiently carried out without bogging and sintering of the ore. In this zone the temperature is maintained at 900–1600° F. and preferably at 1100–1400° F. for efficient reduction of the FeO by hydrogen. Hydrogen of 50 to 90% or better purity is introduced into this zone and it is partially oxidized to water by reducing the FeO and the ratio of water to hydrogen in the effluent gases leaving this zone is below that required by equilibrium conditions for the reduction of FeO to Fe. The ratio of water to hydrogen in this zone can be 0.19 to 0.56 and preferably 0.32 to 0.47. If air is used as the oxidizing gas introduced into zone 2 to partially oxidize the hydrocarbon fuel, an average amount of nitrogen in the gases introduced into this zone will be 10–70%, preferably about 20–50%. Also, depending on the degree of completion of oxidation in zone 2 and reduction in zone 1, there may be small amounts of methane gas introduced into zone 3 with the recycled hydrogen. This amount is kept below 10% and preferably below 5%.

Depending on the pressure at which the system is maintained, the effluent gases to be recycled after the shift conversion reaction can be cooled by suitable indirect cooling means to a temperature below 300° F., preferably below 212° F. by indirect heat exchange with a suitable fluid, e.g., cool recycle gas. Additional cooling, if necessary to about ambient temperature, can be accomplished by further cooling. The amount of cooling required to remove the water will depend upon the pressure at which the reaction is carried out.

After cooling to about ambient temperatures, the effluent gases are introduced to a conventional carbon dioxide scrubber.

A typical carbon dioxide scrubber is one involving the use of a scrubbing solution which is continuously recycled between an absorption column and a regeneration column. The scrubbing operation provides the steps of contacting the carbon dioxide-containing gas mixture in an absorption column maintained at a supra-atmospheric pressure of at least 50 pounds per square inch gage with a scrubbing solution comprising an aqueous solution of an alkaline reagent such as alkali metal carbonates, alkali metal phosphates, and alkanolamines. Carbon dioxide is absorbed in the solution, and the solution is conducted from the absorption column to a regeneration stage which includes a boiling and steam stripping column. Therein the pressure upon the solution is reduced, generally to atmospheric or at least substantially below the pressure in the absorption column. Thereafter the hot decompressed solution without any substantial intermediate cooling is subjected to boiling and steam stripping in a countercurrent operation. In the boiling and steam stripping operation the column is maintained at a pressure which corresponds to solution boiling temperatures, this ranging generally from about 175° F. to about 285° F. Thereafter the regenerated solution is recycled to the absorption column and therein treated at a temperature ranging from about 175° F. to about 285° F., and generally not more than about 55° F. below the temperature of the solution leaving the regeneration column.

The dry carbon dioxide scrubbed gases are then recompressed by a suitable compressor, a sufficient amount to be reintroduced then into the bottom of the reactor. This normally requires an increase in pressure by about 5 to 100 p.s.i.g. After recompression, the recycled hydrogen is introduced into the bottom of the reactor but, prior to introduction, is preheated to about 1200–2000° F., more usually to 1500 to 1800° F. This degree of preheating will normally be high enough to supply any heat requirements to the ferrous reduction zone not supplied by the sensible heat of the partially reduced iron ore introduced into this zone.

For a better understanding of the present invention, reference may be had to the accompanying drawing which comprises a typical flow diagram illustrating the procedural steps for the process according to the present invention. Although the drawing illustrates one arrangement of an apparatus in which the process of this invention may be practiced, it is not intended to limit the invention to the particular apparatus or material described.

Iron ore from an external source not shown is introduced into zone 1 through line 13. This ore has been suitably sized in a grinding roll, not shown, to produce fluidized particles having an average size and range of about 10–3000 microns. A hydrocarbon stream is preheated by a means not shown and introduced through line 20 into zone 2. Air which is preheated by a means not shown is introduced to zone 2 through line 4. Zone 2 is maintained as a fluid bed and consists primarily of iron ore in a state of FeO and a minor amount as $Fe_3O_4$. The iron ore is introduced into zone 2 from zone 1 as primarily $Fe_2O_3$ and $Fe_3O_4$ and is rapidly reduced in zone 2 to FeO and Fe. The temperature in zone 2 is controlled at about 1600° F. by controlling the ratio of fuel and air introduced to this zone. Fuel injected into zone 2 is partially oxidized by the air to primarily carbon monoxide and hydrogen and small amounts of carbon dioxide and water. Some cracking of the hydrocarbon to carbon and hydrogen also takes place. Additional carbon dioxide and water are produced as oxidation products of carbon monoxide and hydrogen which are the oxidation reaction products of the reduction of $Fe_3O_4$ to FeO. The ratios of carbon dioxide to carbon monoxide and of water to hydrogen in this zone are below the equilibrium levels required for reduction of $Fe_3O_4$ to FeO. The ratio of carbon dioxide to carbon monoxide is 3.0 to 4.6 and of water to hydrogen is 3.0 to 6.7. The atomic ratio of oxygen in the air to carbon in the hydrocarbon fuel can be 0.75 to 1.5. As preheated ore is fed into zone 2 through downcomer 11, the reduced ore in zone 2 overflows into downcomer 10 and is fed into zone 3. The off gases from zone 2 flow into chamber 9 and contain entrained therein small solid particles of iron ore. The gas and entrained solids are withdrawn from chamber 9 through line 5 into cyclone separator 6, wherein the solids are separated and returned to bed 2 through line 7 and the solids free gases are withdrawn from cyclone 6 through line 8 and introduced into preheat pre-reducing zone 1. These gases fluidize the finely divided iron ore in this zone and preheat the iron ore in this zone by transferring to the cold iron ore the sensible heat of the effluent gases from zone 2. Though preheat and pre-reduction of the iron ore in zone 1 takes place, the primary function of zone 1 is to provide a catalyst for converting the carbon monoxide and water in the effluent gases from zone 2 into hydrogen and carbon dioxide. This conversion reaction is carried to about 90 to 95% completion and the gases leaving zone 1 are withdrawn through line 16 and consist primarily of carbon dioxide, hydrogen, water and nitrogen and little, if any, carbon monoxide or methane. These gases, which contain some entrained solids, are introduced through line 16 into cyclone separator 14 wherein the solids are separated from the gas and returned through line 15 to zone 1 and the solids free gases are withdrawn through line 17.

If air is used as the oxidizing gas to partially oxidize this fuel in zone 2, there is a tendency for a buildup of nitrogen and inert gases in the effluent gases in line 17. These gases may be periodically purged by opening valve 18 and allowing the gases to escape through line 19. Effluent gases from zone 1 are then introduced through line 17 into suitable heat exchange zone 21 where the gases are cooled, for example by indirect heat exchange with the cool hydrogen gas in line 31. In this embodiment of the invention the reduction reactions are carried out at a pressure of about 20–650 p.s.i.g. and the difference in pressure from the bottom of zone 3 and the top of zone 1 is about 10–60 p.s.i.g. Therefore, the gases introduced into cooler 21 are at the pressure of 10–640 p.s.i.g. and on being cooled by indirect heat exchange in cooler 21 to a temperature of 300° F., some or all of the water in the gas is condensed and removed through line 24. The gases thus reduced in water content may be introduced to a second cooler 22 wherein cooling water at about ambient temperature is introduced through line 28 and removed by line 29. The gases are therein cooled to about ambient temperature and any remaining moisture condensed are removed. The thus dried gases are withdrawn through line 26. The condensed water from cooler 22 is removed through line 27.

The dry gases, consisting primarily of hydrogen and $CO_2$, are withdrawn from cooler 22 via line 26 and introduced into zone 23 containing a selective solvent for carbon dioxide, for example, monoethanolamine, to remove carbon dioxide from the dry gases. The solvent containing the absorbed carbon dioxide is removed through line 30 and regenerated and reintroduced to carbon dioxide scrubber 23. The gas is withdrawn from scrubber 23 by line 31 and consists primarily of pure hydrogen and minor amounts of nitrogen, depending on what oxidizing gas was used in the gasification zone. Very small amounts of methane may be present due to incomplete combustion of the hydrocarbons introduced into zone 2. However, any methane not oxidized in zone 2 may be oxidized in zone 1 by contact with the highly oxidized ore in this zone; therefore, less than about 10% methane, preferably less than 5% methane, will be present in the recycle gases. The cold gases at about 10 to 640 p.s.i.g. are increased in pressure by compressor pump 32 by about 40 to 60 p.s.i.g. and due to compression are slightly increased in temperature and withdrawn from the pump at line 31 and indirectly heat exchanges in heat exchanger 21 with the hot effluent gases from zone 1 wherein the temperatures are increased from about ambient temperature to about 500 to 700° F.

The thus preheated gases are fed through line 31 and introduced into a suitable furnace 33 wherein the temperature is further increased to a temperature of about 1600 to 2200° F. Usually, the recycle hydrogen will be increased in temperature to 200 to 600° F. above the temperature of reaction zone 3, so that the sensible heat of the hydrogen will provide part of the heat required to carry out the endothermic reduction reaction in zone 3. The temperature in zone 3 for advantageous reduction at pressures of about 20 to 600 p.s.i.g. are maintained at about 1100–1400° F. The iron in this zone is reduced from FeO to about 90 to 98% Fe. Using substantially pure hydrogen as a reducing agent in this zone provides the highest reducing potential gas where it is needed most. The ratio of water to hydrogen in this zone is less than 0.32 to 0.47. The hydrogen introduced to this zone is substantially dry but water is produced as an oxidation product of the reduction reaction. The nitrogen concentration in the gases introduced to zone 3 where oxygen-enriched air was used to combust the hydrocarbon fuel in zone 2 is about 10 to 30% by volume. An estimated percentage or efficiency of reduction per pass in this zone is about 50% of theoretical. The reduced iron in this zone overflows into downcomer 39 and is removed from the reaction zone and taken to storage or for further treatment.

It is obvious from the above description that several of the basic disadvantages of directly reducing iron ore have been overcome. There is ample heat supplied to each of the three zones and the amount of heat required in a particular zone can be carefully regulated and controlled. The problem of catastrophic carbonization during heating of the recycle gas has been overcome by introducing pure hydrogen into zone 3 and, during cooling, by cooling the recycle gases in zone 1 by contact with a highly oxidized ore which reduces the tendency for carbon to deposit and collect in the zone. The above described process represents a minimum of investment in equipment and fixed facilities in that two of the zones perform two or three functions thereby cutting the cost of equipment required. The cost of the reducing gas is substantially reduced by recycling of unconverted reducing gases.

The invention is further illustrated by the following example. Natural gas at a rate of 84,000 cubic feet per day is preheated to about 900° F. and reacted at a pressure of about 80 p.s.i.g and a temperature of about 1550° F. with 240,000 cubic feet per day of air which is preheated to about 1200° F. to produce 450,000 cubic feet per day of synthesis gas comprising predominantly hydrogen and carbon monoxide in a volumetric ratio of carbon monoxide to hydrogen of 0.5. The carbon monoxide and hydrogen in the gas react with preheated pre-reduced iron ore at a temperature of 1550° F. to reduce the iron ore to FeO. The off gases from this zone contain a ratio of carbon dioxide to carbon monoxide of about 0.23 and water to hydrogen of about 0.21

The effluent gases are contacted countercurrently in a fluidized bed with cool iron ore wherein the iron ore is preheated to a temperature of 700° F. and is dried and the carbon monoxide and water in the gases introduced into preheat zone are converted into carbon dioxide and hydrogen. This reaction takes place at a temperature of about 700° F. The water shift conversion taking place in this zone converts 90 to 95% of the carbon monoxide present to carbon dioxide by reaction with water which is converted to H₂, making an equal molar amount of hydrogen. The carbon monoxide content of the effluent gases from this zine is 1.5 vol. percent. These gases are suitably cooled and treated to remove carbon dioxide and water and a dry hydrgen gas free of carbon dioxide is obtained. The composition of this gas is as follows: Hydrogen, 83%; nitrogen, 14%; methane, 1%; other, 2%. This gas is at about 65 p.s.i.g. and is compressed in a suitable pump to about 120 p.s.i.g. and heated from about ambient temperature to about 1600° F. which is about 300° higher than the reduction temperature in the FeO–Fe reducing zone which is maintained at a temperature of about 1300° F. The thus heated hydrogen provides heat for the endothermic reaction in this zone and reduces the FeO to Fe and converts some of the hydrogen to water. Hot product containing about 85% of the iron in metallic form is removed from the hydrogen reduction zone and suitably treated to render it non-pyrophoric and taken to storage for later use.

In the gasification zone in which the synthesis gas was produced and reduction was initiated, the atomic ratio of oxygen in the oxygen-containing gas to carbon in the methane is about 1.0. In accordance with this process, the synthesis gases produced in the gasification zone can be recycled to extinction with about a 10% by volume purge periodically to keep the nitrogen concentration between 10 and 30%.

Obviously, many modifications and variations of the invention as herein before set forth may be made without departing from the spirit and scope thereof. For example, a portion of the hydrogen from the ferrous reduction zone can be cooled to remove water and recycled directly to the reduction zone. Only such limitations should be included as are indicated in the appended claims.

What is claimed is:

1. In a staged iron ore reduction process wherein iron oxides are fluidized by injecting reducing gases including carbon monoxide and hydrogen, the ore reduced, and at least a portion of the reducing gases is oxidized to form water and carbon dioxide, the effluent from the process treated by removing oxidized components to regenerate the reducing potential of said effluent gases, and wherein a reduced iron product is withdrawn from a final stage the improvement comprising injecting oxygen into an intermediate stage, combusting said gases with oxygen and reducing the oxidic iron ore to ferrous oxides at temperatures ranging from about 1200° F. to about 1800° F. to produce an effluent which includes carbon monoxide, hydrogen and water, withdrawing the heated effluent and feeding same into a contiguous preceding stage, containing ferric oxide, preheating, and partially reducing the ferric oxide while maintaining a temperature ranging from about 600° F. to about 900° F. in said stage to convert water to hydrogen.

2. The process of claim 1 wherein a plurality of preheat stages precede the said intermediate gas combustion stage.

3. The process of claim 2 wherein up to about 7 preheat stages are provided.

4. In a staged iron ore reduction process wherein iron oxides are fluidized by ascending gases, reduced, the effluent from the process treated by removing water and carbon dioxide to regenerate the reducing potential of said effluent gases, and wherein a reduced iron product is withdrawn from a final stage the improvement comprising injecting hydrocarbon fuel and an oxygen-containing gas into an intermediate stage, combusting said fuel and reducing the oxidic iron ore to ferrous oxide at temperatures ranging from about 1200° F. to about 1800° F. to produce an effluent which includes carbon monoxide, hydrogen and water, withdrawing the heated effluent and feeding same into a contiguous preceding stage, containing ferric oxide, preheating, and partially reducing the ferric oxide while maintaining a temperature ranging from about 600° F. to about 900° F. in said stage to convert water to hydrogen.

5. The process of claim 4 wherein steam from an external source is directly added to the said preceding stage to supply additional moisture for conversion to hydrogen.

6. In a process for reducing oxidic iron ore to metallic iron wherein is included a series of reaction zones containing fluidized iron ore, wherein the ore is successively passed from one reaction zone to another and simultaneously consecutively reduced from ferric oxide to substantially metallic iron by countercurrent contact with reducing gases, said zones including an initial preheat-conversion zone containing ferric oxide, an intermediate gasification-reduction zone wherein partially reduced ore is further reduced, and an adjacent ferrous reduction zone, the combination of steps comprising (1) injecting a hydrocarbon fuel and an oxygen-containing gas into the gasification-reduction zone containing preheated fluidized iron oxides to crack and partially oxidize the hydrocarbon to form a gaseous effluent consisting essentially of carbon monoxide, hydrogen and water, and simultaneously reducing the iron oxides to ferrous oxide and minor amounts of metallic iron, while maintaining a temperature of from about 1200° F. to about 1800° F. within said zone, (2) withdrawing ferrous oxide from the gasification-reduction zone and passing same to the ferrous reduction zone, (3) feeding the hot effluent gas from the gasification-reduction zone into the pre-heat-conversion zone to partially reduce the ferric oxide and to convert the carbon monoxide and excess water to a reaction gas consisting essentially of carbon dioxide and hydrogen, to preheat the iron ore and to maintain a temperature of from about 600° F. to abou 900° F. within said zone, (4) withdrawing the partially reduced oxides from the preheat-conversion zone and passing same to the gasification-reduction zone, (5) removing the reaction gases from said preheat-conversion zone, separating carbon dioxide and water therefrom to form a residual gas consisting essentially of hydrogen, (6) passing the residual hydrogen gas to the ferrous reduction zone and therein contacting together the hydrogen and ferrous oxide while maintaining a temperature ranging from about 900° F. to about 1600° F. to effectively reduce said ferrous oxide to substantially metallic iron, and (7) passing the gases generated in the ferrous reduction zone to the gasification-reduction zone.

7. The process of claim 6 wherein the temperature of the gasification-reduction zone is maintained at from about 1500° F. to about 1700° F., the temperature of the preheat-conversion zone is maintained at from about 700° F. to about 800° F. and the temperature of the ferrous reduction zone is maintained at from about 1100° F. to about 1400° F.

8. In a process for reducing ferric oxide containing oxidic iron ores to metallic iron wherein is included a staged series of reaction zones containing fluidized iron ore, wherein the ore is successively passed downwardly from an initial preheat-conversion zone, thence to an adjacent gasification-reduction zone, and thence from the gasification-reduction zone to a contiguous ferrous reduction zone, the combination of steps comprising (1) injecting a hydrocarbon fuel and an oxygen-containing gas into the gasification-reduction zone maintained at a temperature ranging from about 1200° F. to about 1800° F. and, within said zone which contains preheated fluidized iron oxides, cracking and partially oxidizing the hydrocarbon to form gaseous effluent consisting essentially of carbon monoxide and hydrogen which effluent further reacts with the iron oxides to form ferrous oxide, minor amounts of metallic iron, and additional effluent consisting essentially of water and carbon dioxide, (2) withdrawing ferrous oxide from the gasification-reduction zone and passing same to the ferrous reduction zone, (3) feeding said effluent gas into a preheat-conversion zone maintained at a temperature ranging from about 600° F. to about 900° F. and, within said zone, which contains fluidized ferric oxide containing iron ore, reducing the ore while converting the carbon monoxide and excess water into carbon dioxide and hydrogen, respectively, and simultaneously heating the iron ore by direct contact of the ore with said effluent gases, (4) feeding the preheated partially reduced iron ore from said preheat-conversion zone into said gasification-reduction zone, (5) removing the reaction gases from said preheat-conversion zone and separating carbon dioxide and water therefrom to leave a gas consisting essentially of hydrogen, (6) contacting the remaining hydrogen gas with ferrous oxides in a ferrous reduction zone at temperatures ranging from about 900° F. to about 1600° F. to reduce said ferrous oxides substantially to metallic iron, (7) passing the gases generated in the ferrous reduction zone to the gasification-reduction zone, and then (8) recovering the metallic iron.

9. The process of claim 8 wherein the iron ore is recovered with 50 to 99% metallization.

10. The process of claim 8 wherein the effluent gases from the gasification reduction have a ratio of carbon dioxide to carbon monoxide of less than 1.5 to 5.25 and a ratio of water to hydrogen of less than 0.9 to 9.0.

11. The process of claim 8 wherein the effluent gas from the ferrous reduction zone has a water to hydrogen ratio of less than 0.19 to 0.56.

12. In a process for reducing ferric oxide containing oxidic iron ores to metallic iron wherein is included a staged series of three reaction zones containing fluidized iron ore, wherein the ore is gravitated in sequence from one reaction zone to the next and simultaneously consecutively reduced by countercurrent contact with reducing gases, said zones including an upper preheat-conversion zone, a gasification-reduction zone at intermediate level, and a lower ferrous reduction zone, the combination of steps comprising (1) injecting a hydrocarbon fuel and an oxygen-containing gas into the gasification-reduction zone maintained at a temperature ranging from about 1200° F. to about 1800° F. and wherein is fed, from a preheat-conversion zone described hereafter, preheated fluidized iron oxide, and therein cracking and partially oxidizing the hydrocarbon to form gaseous effluent consisting essentially of carbon monoxide and hydrogen which is at least partially reacted with the iron oxides to form ferrous oxide, minor amounts of metallic iron, and additional effluent consisting essentially of water and carbon dioxide, (2) withdrawing ferrous oxide from the gasification-reduction zone and passing same downwardly to the ferrous reduction zone, (3) feeding the effluent gas, with steam, to a preheat-conversion zone to which the ferric oxide containing oxidic iron ore is initially introduced and maintained at a temperature ranging from about 600° F. to about 900° F., which zone contains relatively cool fluidized iron ore, and therein converting the carbon monoxide into carbon dioxide and water and steam into hydrogen, and simultaneously cooling the gases generated and partially reducing the iron ore of the preheat-conversion zone by the direct contact of the ore with said effluent gases, (4) feeding the preheated partially reduced iron ore from said preheat-conversion zone into said gasification-reduction zone, (5) removing the reaction gases from said preheat-conversion zone, cooling the gases and separating out water, then scrubbing the gases to remove carbon dioxide therefrom to leave a gas consisting essentially of hydrogen, (6) preheating the hydrogen is stepwise increments, first to a temperature ranging from about 500° to about 700° F. and thence to a temperature ranging from about 1600° F. to about 2200° F., (7) passing the preheated hydrogen into the ferrous reduction zone and contacting the hydrogen with ferrous oxide and maintaining temperatures ranging from about 1100° F. to about 1400° F. to reduce said ferrous oxide substantially to from about 90 to about 98 percent metallic iron while oxidizing hydrogen to water to form an effluent consisting primarily of unreacted hydrogen and water, (8) introducing said effluent into the gasification zone to aid in the reduction of the ferric oxide, while (9) recovering the metallic iron from the ferrous reduction zone.

13. In a three-step iron ore reduction process where iron oxide is reduced from $Fe_2O_3$ to Fe the sequence of steps comprising forming (A) an initial ore preheat, prereducing, and reducing gas cooling and shift conversion zone, (B) a gasification, heating and reducing zone, and (C) a hydrogen reducing zone;

feeding into said gasification zone (B) a hydrocarbon fuel and an oxygen-containing gas and partially combusting the resultant mixture of fuel and gas at a temperature of 1200–1800° F. to produce carbon monoxide and hydrogen which react with iron oxides present, reducing the oxides predominantly to FeO while simultaneously heating the reduced oxides to about 1200–1800° F.;

withdrawing the FeO and by gravity flow passing same to zone (C);

feeding the effluent gases from this zone (B) to said preheat zone (A) and countercurrently contacting the gas in said zone (A) with cool iron ore feed to heat the cold ore and rapidly cool the effluent gases to a temperature of 600–900° F., wherein the carbon monoxide and water in the gases are catalytically converted to carbon dioxide and hydrogen, the reaction being carried out in such a manner that at least some of the $Fe_2O_3$ feed is reduced to $Fe_3O_4$;

then flowing by gravity the partially reduced and heated ore into the gasification zone (B) wherein it is further reduced to substantially FeO;

cooling the effluent gases from said preheat zone (A) to remove water, and suitably treating same to remove carbon dioxide and then heating the residual gas to a temperature above the temperature of the reduction reaction in the hydrogen reducing zone (C);

and then feeding same to said zone (C) and countercurrently contacting same with FeO to reduce the FeO to Fe at a temperature of about 900–1600° F.;

then introducing the effluent gases from this zone (C), containing primarily hydrogen and minor amounts of water, to the gasification zone (B) wherein it is admixed with the carbon monoxide and hydrogen produced by the partial combustion of the hydrocarbon fuel;

and then removing the reduced Fe from said hydrogen reducing zone (C).

14. The process of claim 1 wherein oxygen is added to the combustion stage in quantity ranging from about 0.002 to about 0.02 mole of oxygen, per mole of reducing gas.

15. The process of claim 1 wherein hydrocarbon fuel is injected with oxygen into the intermediate stage.

References Cited

UNITED STATES PATENTS 3,126,276    3/1964    Marshall -------------- 75—26

BENJAMIN HENKIN, *Primary Examiner.*